Aug. 1, 1967  S. E. WILLIAMS  3,333,761
INJECTORS FOR BREATHING APPARATUS
Filed Feb. 20, 1964  3 Sheets-Sheet 1

United States Patent Office 3,333,761
Patented Aug. 1, 1967

3,333,761
INJECTORS FOR BREATHING APPARATUS
Stanley E. Williams, Yeovil, Somerset, England, assignor to Normalair Limited, Yeovil, Somerset, England
Filed Feb. 20, 1964, Ser. No. 346,136
Claims priority, application Great Britain, Feb. 27, 1963, 7,792/63
4 Claims. (Cl. 230—103)

This invention relates to breathing apparatus and more particularly to an airmix injector for use with oxygen demand regulators.

Oxygen demand regulators often employ airmix injectors so that economy in the use of oxygen is achieved. Such injectors usually take the form of a long tube with an air entry at one end and the delivery outlet at the other. A nozzle is provided such that oxygen is injected into the air inlet end of the tube in such a manner that air is drawn into the tube.

Such an arrangement is large in size and thus creates a serious problem when applied to miniature demand regulators, for example, of the type suitable for attachment to face masks.

It is an object of the present invention, therefore, to provide a compact airmix injector.

According to the invention, an injector for use in breathing apparatus includes a number of air ducts, all located approximately in one flat plane, and leading from points at which a supply of air is available into a common outlet arranged to be connected to a location at which a mixture of air and oxygen is to be inhaled, and nozzle means arranged to receive oxygen under pressure and to deliver the oxygen so as both to induce the air through the ducts, and to mix with the air so induced.

In order that the invention may be clearly understood and readily carried into effect, apparatus in accordance therewith will now be described, by way of example, with reference to the accompanying drawings, in which.

Figure 1:
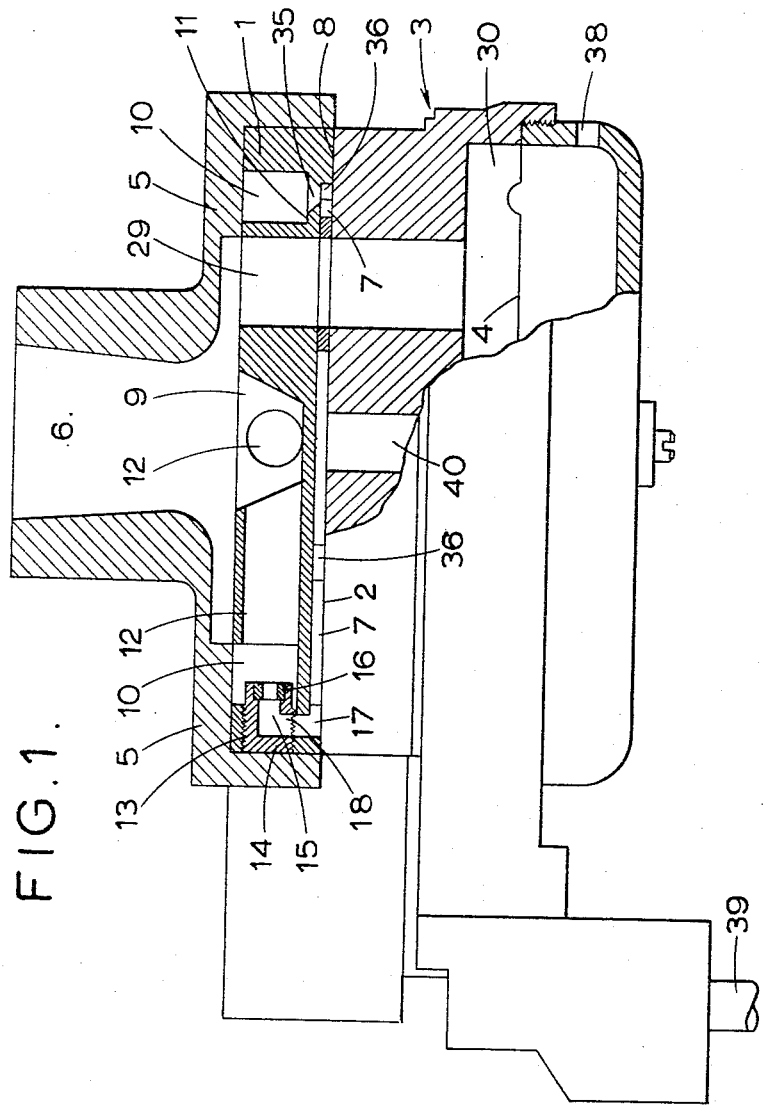
FIGURE 1 is a side elevation of the apparatus, shown partly in section, the section being on the lines I—I in FIGURE 2.

In the preferred form the airmix injector assembly comprises an arrangement that is basically in the form of a flat plate in the shape of a disc 1, for example of two inch diameter and a quarter of an inch thick. A projection 1a is formed on the circumference of the disc for a purpose described below.

The disc 1 is located between an outlet face 2 of a demand regulator and a mounting flange 5, having an outlet 6 in its centre. The face of the disc 1 adjacent to the regulator 3 is provided with a shallow recess 7, which extends almost to the diameter of the disc, but leaves a small land 8 to face against the regulator face 2. A thin gasket may be fitted between the joint. The side of the disc 1 remote from the regulator 3, hereafter called the flange face, carries a central blind-ended tapered hole 9, the wider open end being disposed away from the regulator 3. At a larger diameter on the flange face, an annular groove 10 of rectangular cross section is formed. The depth of the groove 10 is such that only a thin wall 11 is left between it and the shallow recess 7 and the central hole 9 is of similar depth. Five radial ducts or holes 12 are drilled through the disc 1, such that they pass through the annular groove 10, and then join the central hole 9. The outer end 13 of each radial hole 12 is screw-threaded between the outside diameter of the disc 1 and the annular groove 10, and inserted into each of these screw threads is a plug 14, these plugs being formed with a blind-ended hole 15 at the inner end. An orifice 16 is fitted into the open end of the hole 15 in each plug 14. The shallow recess 7 is extended slightly into the small land 8 by five radial slots 17 which correspond to the radial holes 12. When the screw-threaded plugs 14 are locked in their correct positions, five passages 18 are drilled, so that each slot 17 is connected to its respective orifice 16 in the plug 14. The annular groove 10 is connected by a passage 19 to a port 20 in the projection 1a arranged on the circumference of the disc 1, and this port 20 is in communication with ambient air by way of a lightly spring-loaded non-return valve 21. The ambient air enters the port 20 after passing through gauze-protected ports 22 in a flange 23 closed at its free end by a cover 24, on which a valve member 25 is reciprocable. The valve member 25 throttles the flow of air through the port 20 to an extent determined by the ambient air pressure which acts on an aneroid 26. When the air pressure falls, the aneroid 26 expands with the assistance of a spring 27, so as to reduce the passage through which the air must pass to the port 20.

Figure 2:
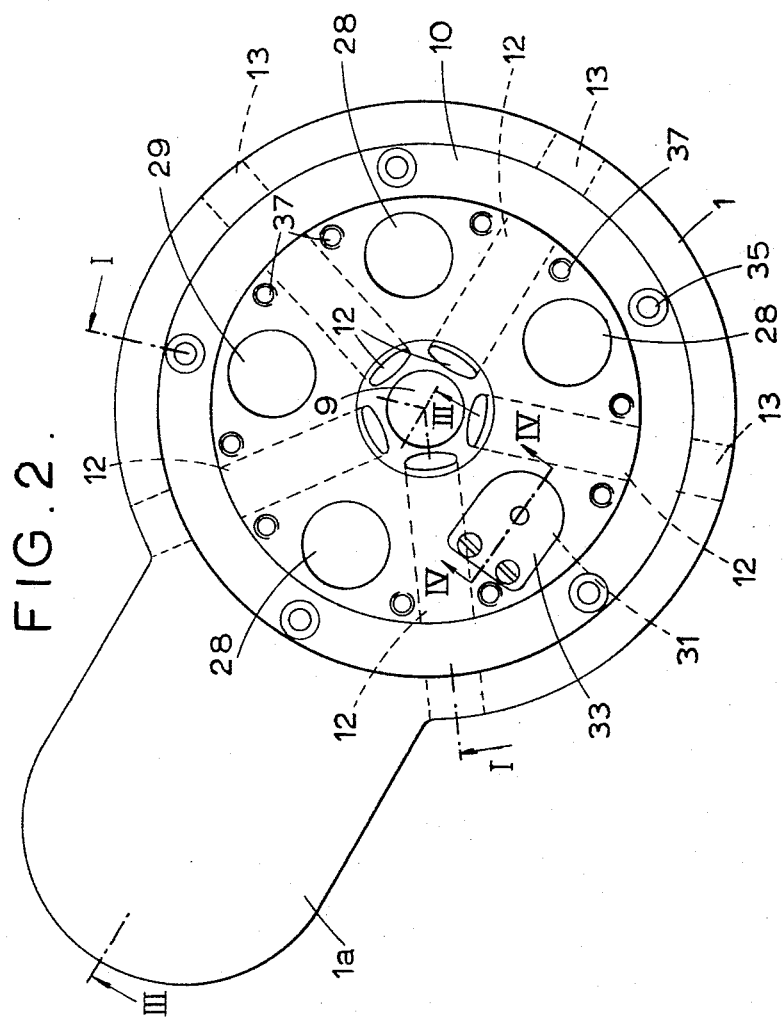
FIGURE 2 is a plan of part of the apparatus of FIGURE 1.
Figure 3:
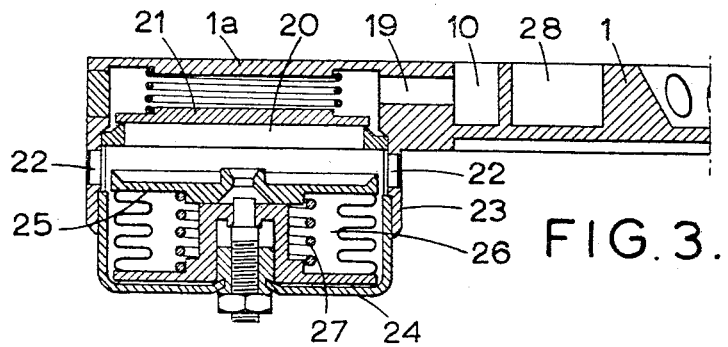
FIGURE 3 is a section on the line III—III in FIGURE 2.
Figure 4:
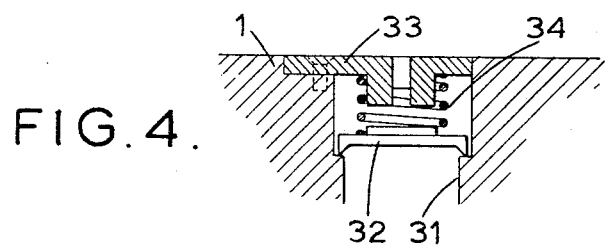
FIGURE 4 is a section on the line IV—IV in FIGURE 2.

In the disc 1 between the radial holes 12, and in the metal between the central hole 9 and the annular groove 10, five lightening holes are provided, three holes 28 being drilled from the flange face are blind-ended, and one hole 29 being drilled right through the disc 1 and arranged to be sealed against the regulator face in a position such that it may act as part of a sensing passageway between the regulator sensing chamber 30 and the demand outlet 6 in the mounting flange 5. The remaining lightening hole 31 is provided with an automatic relief valve 32 (FIGURE 4) which acts to release excessive pressure in the shallow recess 7 to the demand outlet 6. The relief valve 32 is mounted to reciprocate with respect to a plate 33 secured at one edge to the disc 1. A spring 34 normally holds the valve 32 on its seating, and the pressure between the flange 5 and the disc 1 is transmitted past a free edge of the disc to the valve 32. The mounting flange 5 is arranged to close the open side of the annular groove 10. Screws 35 secure the disc 1 to the regulator 3 to hold the disc to lugs 36 on the regulator, and another set of screws (not shown) screwed into holes 37 (FIGURE 2) secure the mounting flange 5 to the disc 1.

In operation, the user, wearing a mask connected to the outlet 6, inhales and causes a depression at the outlet 6. This is transmitted through the hole 29 to the depression chamber 30, and causes a diaphragm 4 in the regulator 3 to be deflected, the opposite side of the diaphragm being in communication with the ambient atmosphere through an opening 38. The deflection of the diaphragm 4 operates, in a manner well known to those skilled in the art, an inlet valve (not shown) which places a conduit 39 into communication with a passage 40 leading into the shallow recess 7. The oxygen passes outwards into the radial slots 17, and then through the passages 18 to the orifices 16 in the plugs 14. Oxygen is then ejected at a high velocity across the annular groove 10, and into the radial ducts or holes 12. The orifices 16 and the radial holes 12 act as injectors and air is entrained from the annular groove 10, this air being drawn from the atmosphere by way of the ports 22 past the non-return valve 21 and through the passage 19 into the annular groove 10. The mixture of air and oxygen then passes to the central hole 9, and is discharged into the demand outlet 6 to pass to the respiratory tracts of the user. Should the pressure in the shallow recess 7 rise above a predetermined value, the relief valve 32 will open and bypass the orifices 16. Should the user be exposed to a low pressure, for example corresponding to an altitude of 15,000 feet or more, the aneroid controlled valve 25 will close and stop ambient air being drawn into the injector system.

Figure 5:
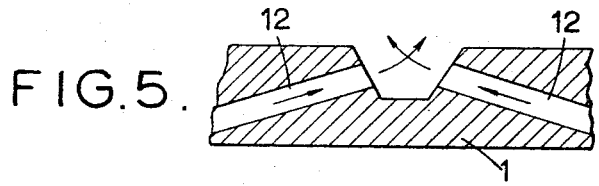
FIGURES 5, 6 and 7 are diagrammatic sections respectively showing three modifications of portions of the apparatus of FIGURES 1 to 4.
Figure 6:
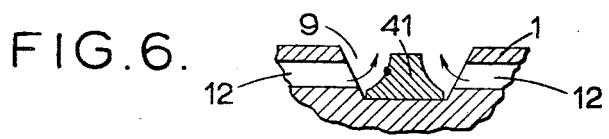

Whilst one form of the invention has been described, it is to be understood that various modifications can be carried out without departing from the scope of this invention. For example, one of these modifications consists in arranging the radial holes 12 to be at an angle such that their axes lie on the surface of a very shallow cone, as shown in FIGURE 5. Another modification, shown in FIGURE 6, consists in providing a deflector 41 in the hole 9 for deflecting the mixture of air and oxygen axially into the demand outlet 6.

Figure 7:
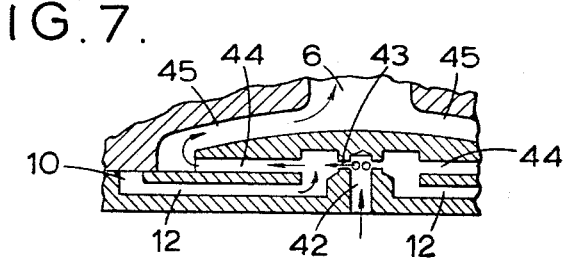

FIGURE 7 shows an arrangement in which air alone passes along the radial holes 12 from the annular groove 10, the shallow recess being omitted and the oxygen being directed along an axial passage 42, from which it emerges through orifices 43, drawing the air along the radial holes 12 by injector action and delivering the mixture along radial passages 44, leading into a manifold 45 that delivers the mixture to the demand outlet 6.

I claim as my invention:

1. An injector for use in breathing apparatus, said injector including, in combination, a unit formed with a plurality of air ducts, each having an inlet end and an outlet end, and with an outlet aperture into which all said air ducts lead at their outlet ends, said ducts radiating from said outlet aperture, and being substantially equidistantly distributed about said outlet aperture, means for providing a supply of ambient air to the inlet ends of all said ducts, nozzle means, and means for supplying oxygen under pressure to said nozzle means, said nozzle means being mounted and operative to project oxygen both so as to induce air through said ducts, and to mix with the air so induced.

2. An injector according to claim 1, in which said means for providing a supply of ambient air to the inlet ends of all said ducts include an endless passage formed in said unit, and connecting all said ducts.

3. An injector for use in breathing apparatus, said injector including, in combination, a unit formed with a plurality of air ducts located approximately in one flat plane and each having an inlet end and an outlet end, an outlet aperture formed in said unit into which all said ducts lead, said ducts radiating from said outlet aperture, said unit being further formed with an endless passage connecting the inlet ends of all said ducts for providing a supply of ambient air thereto, nozzles allocated respectively to said ducts, means for supplying oxygen under pressure to said nozzles, said nozzles being mounted and operative to project the oxygen across said endless passage into said ducts so as to induce air through said ducts and to mix with the air so induced.

4. An injector as set forth in claim 1 wherein said unit comprises a flat plate-like member having said outlet aperture formed therein so as to open from one face thereof, said air ducts being formed in said plate-like member and radiating from said outlet aperture in a common plane, said means for providing a supply of air to said ducts comprising an endless passage into which the inlet ends of said ducts open, said nozzle means being mounted in said endless passage and longitudinally aligned with respective ones of said air ducts so as to project oxygen into said ducts and induce air flow from said endless passage into said ducts, said plate-like member having its opposite face relative to the outlet aperture formed to receive a demand regulator in sealing engagement, said opposite face having passage means opening therefrom and leading to said nozzle means for supplying oxygen thereto.

References Cited

UNITED STATES PATENTS

| 1,924,038 | 8/1933 | Herbsman | 137—604 |
| 2,970,178 | 1/1961 | Braconier | 158—118 |
| 3,033,196 | 5/1962 | Hay | 137—64 X |

FOREIGN PATENTS 490,593  2/1953  Canada.

WILLIAM F. O'DEA, *Primary Examiner.*

H. W. WEAKLEY, *Assistant Examiner.*